(No Model.) 2 Sheets—Sheet 1.
C. S. MAULDIN.
CONVERTIBLE CORN AND COTTON PLANTER, STALK CUTTER, AND ROLLER.
No. 559,300. Patented Apr. 28, 1896.
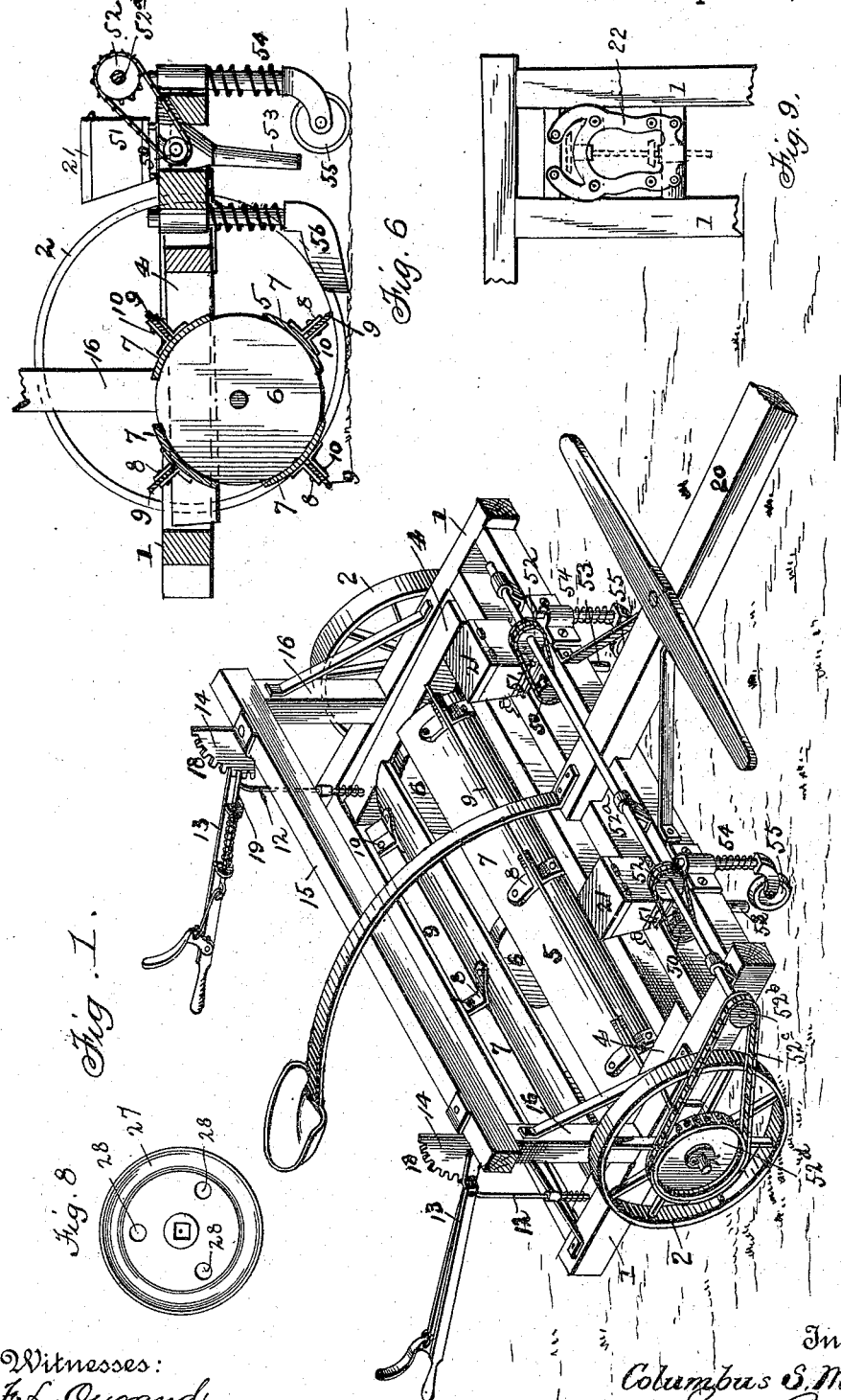
Witnesses:
Inventor:
Columbus S. Mauldin,
by Louis Bagger & Co.
Attorneys.

(No Model.) 2 Sheets—Sheet 2.
C. S. MAULDIN.
CONVERTIBLE CORN AND COTTON PLANTER, STALK CUTTER, AND ROLLER.
No. 559,300. Patented Apr. 28, 1896.
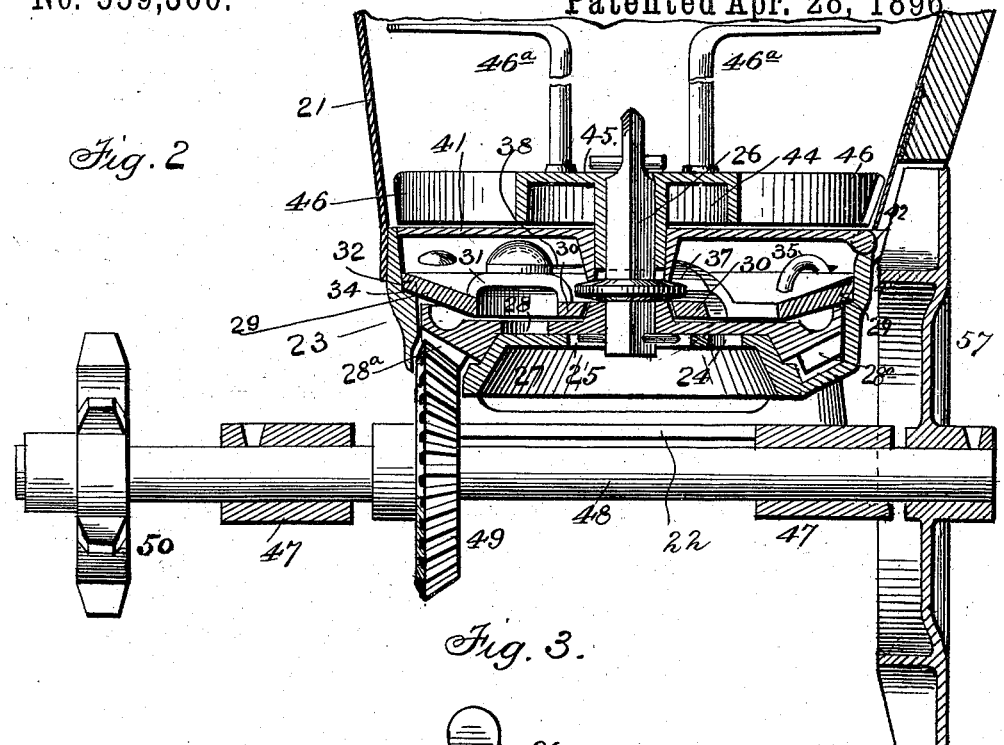
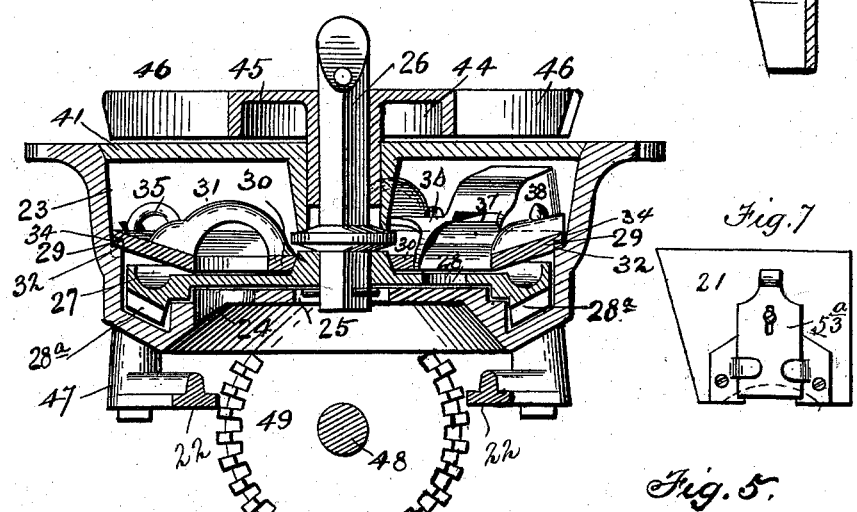
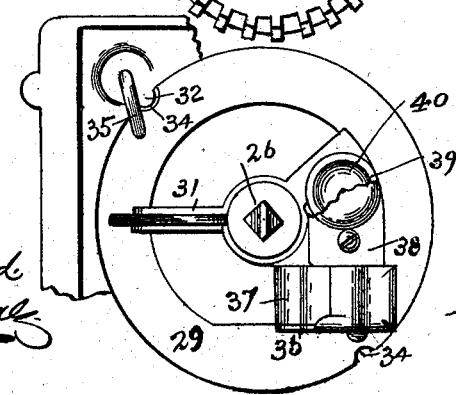

UNITED STATES PATENT OFFICE.

COLUMBUS SCOTT MAULDIN, OF WOLFE CITY, TEXAS.

CONVERTIBLE CORN AND COTTON PLANTER, STALK-CUTTER, AND ROLLER.

SPECIFICATION forming part of Letters Patent No. 559,300, dated April 28, 1896.

Application filed September 21, 1895. Serial No. 563,265. (No model.)

*To all whom it may concern:*

Be it known that I, COLUMBUS SCOTT MAULDIN, a citizen of the United States, and a resident of Wolfe City, in the county of Hunt and State of Texas, have invented certain new and useful Improvements in Convertible Corn and Cotton Planters, Stalk-Cutters, and Rollers; and I do hereby declare that the following is a full, clear, and exact description of the invention, which will enable others skilled in the art to which it appertains to make and use the same, reference being had to the accompanying drawings, which form a part of this specification.

My invention relates to improvements in convertible corn and cotton planters and stalk-cutters and rollers, and its object is to provide an improved construction of the same, which shall possess superior advantages with respect to efficiency in operation.

The invention consists in the novel construction and combination of parts hereinafter fully described and claimed.

In the accompanying drawings, Figure 1 is a perspective view of a convertible corn and cotton planter and stalk-cutter and roller constructed in accordance with my invention. Fig. 2 is a longitudinal section of one of the seed-boxes. Fig. 3 is a cross-section of the same. Figs. 4, 5, 6, 7, 8, and 9 are detail views.

In the said drawings the reference-numeral 1 designates a rectangular frame, to the sides of which are journaled removable wheels 2. Hinged to a cross-bar of said frame is a supplemental frame 4, and in this frame is journaled a roller 5, consisting of the heads 6 and the transverse segment-plates 7. To these are secured lugs 8 to receive transverse knives 9, which are removably held in place by screw-bolts 10. These knives act as stalk-cutters and are removed, as are also the wheels 2, when desired, so that the roller will act as a clod-crusher. Connected with said supplemental frame are rods 12, the upper ends of which are pivoted to levers 13, which in turn are pivoted to segment-plates 14, secured to a cross-bar 15, supported by uprights 16, secured to the side bars of the frame 1. These segment-plates are formed with rack-teeth 18, with which engage spring-actuated pawls 19.

Secured to the front of frame 1 is the tongue 20, and also secured thereto at each side of the tongue is a seed-box 21. Secured to the lower end of each seed-box is a frame 22, to which is secured a feed-box 23, consisting of a recessed casting having a seed-opening 24 and a central opening 25, in which is seated the lower end of a rotatable angular shaft 26. Secured to this shaft is a feed-disk 27, formed with a number of seed-openings 28 and with cogs $28^a$ on its under side. This disk is held in place by a circular plate or ring 29, having arms 31 and a hub 30, through which said shaft passes. This plate is prevented from rotating by lugs 32, on the casting engaging with notches 34, and is held in place by hooks 35. Formed with said circular plate or ring 29 are projections 36, to which is journaled a seed-gage 37, for regulating the supply of seed to be planted. This gage is held in place by a plate 38, secured to plate 29, and at one end is formed with a concave recess 39, in which is seated a ball 40.

The numeral 41 designates a cover having lugs 42, which engage with notches 43 in the feed-box, and above this cover is located a rotatable wheel 44, comprising the hub 45 and curved fingers 46, and is provided with agitators $46^a$, having the ends bent outwardly at right angles.

The feed-box 21 is provided with a bracket 47, in which is journaled a transverse shaft 48, provided with a cog-wheel 49, which gears with cogs on the under side of the feed-disk 27. Also connected with said shaft is a sprocket-wheel 50, connected by means of a chain 51 with a similar sprocket 52, secured to a shaft $52^a$, provided with a sprocket $52^b$, connected by a chain $52^c$ with a sprocket $52^d$, secured to one of the driving-wheels.

The numeral 53 designates the tubes which convey the seed from the seed-box to the furrow, and the numeral $53^a$ a slidable seed-gage secured to one of the sides of each seed-box.

Secured to the front of the machine are depending rods 54, provided with wheels 55, for laying off the ground and supporting the frame, and in the rear of the seed-boxes are coverers 56, which cover the seed.

As shown in Figs. 2 and 3, the machine is used as a cotton-planter, and to convert it into a corn-planter the wheel 44 is removed and the lid raised and held in such position by any suitable means.

The machine can be used to lay off the ground, drop the seed, and cover and roll the same, two rows at once. When not used as a stalk-cutter, the blades secured to the segment-plates are removed.

To use the machine for a clod-crusher, the said blades and the wheels 2 are removed and the whole weight of the machine will be supported by the roller.

Having thus fully described my invention, what I claim is—

In a convertible corn and cotton planter and stalk-cutter and roller, the combination with the main frame, the supplemental frame, having its front end hinged to the front of the main frame, the roller journaled in said supplemental frame, comprising the circular heads, and the transverse segment-plates secured thereto, provided with removable blades, with spaces between said plates, of the axle, the driving-wheels, the sprocket wheel and chain, the feed-boxes and means for feeding the grain, the wheels for laying the ground and the coverers, substantially as described.

In testimony that I claim the foregoing as my own I have hereunto affixed my signature in presence of two witnesses.

COLUMBUS SCOTT MAULDIN.

Witnesses:
  H. A. DAVID,
  J. K. PARISH.